United States Patent [19]

Ellington

[11] 4,141,236
[45] Feb. 27, 1979

[54] HYDRAULIC SHOCK ABSORBER WITH OUT-OF-LIMIT INDICATOR

[75] Inventor: Kenneth L. Ellington, Sawbridgeworth, England

[73] Assignee: Koni B.V., Oud-Beyerland, Netherlands

[21] Appl. No.: 845,439

[22] Filed: Oct. 25, 1977

[30] Foreign Application Priority Data

Oct. 26, 1976 [GB] United Kingdom ............... 44412/76

[51] Int. Cl.$^2$ ............................................. G01M 17/04
[52] U.S. Cl. ............................................. 73/11; 73/574
[58] Field of Search .......................... 73/11, 574, 575; 340/52 R; 188/1 A

[56] References Cited

U.S. PATENT DOCUMENTS

| 1,921,624 | 8/1933 | Lewis | 73/11 X |
| 3,833,094 | 9/1974 | Grossman | 340/52 R |
| 3,946,598 | 3/1976 | Towne et al. | 73/574 X |
| 3,981,174 | 9/1976 | Himmler | 73/11 |

*Primary Examiner*—Charles A. Ruehl
*Attorney, Agent, or Firm*—James B. Raden; Donald J. Lenkszus

[57] ABSTRACT

A hydraulic shock absorber incorporates a piezoelectric pressure sensor and an electromagnetic velocity sensor coupled to an integrated circuit to measure the force-/velocity characteristic of the shock absorber. When the characteristic falls outside predetermined values, the circuit delivers an electrical output to an electro-chemical color change cell to indicate failure of the shock absorbers.

11 Claims, 2 Drawing Figures

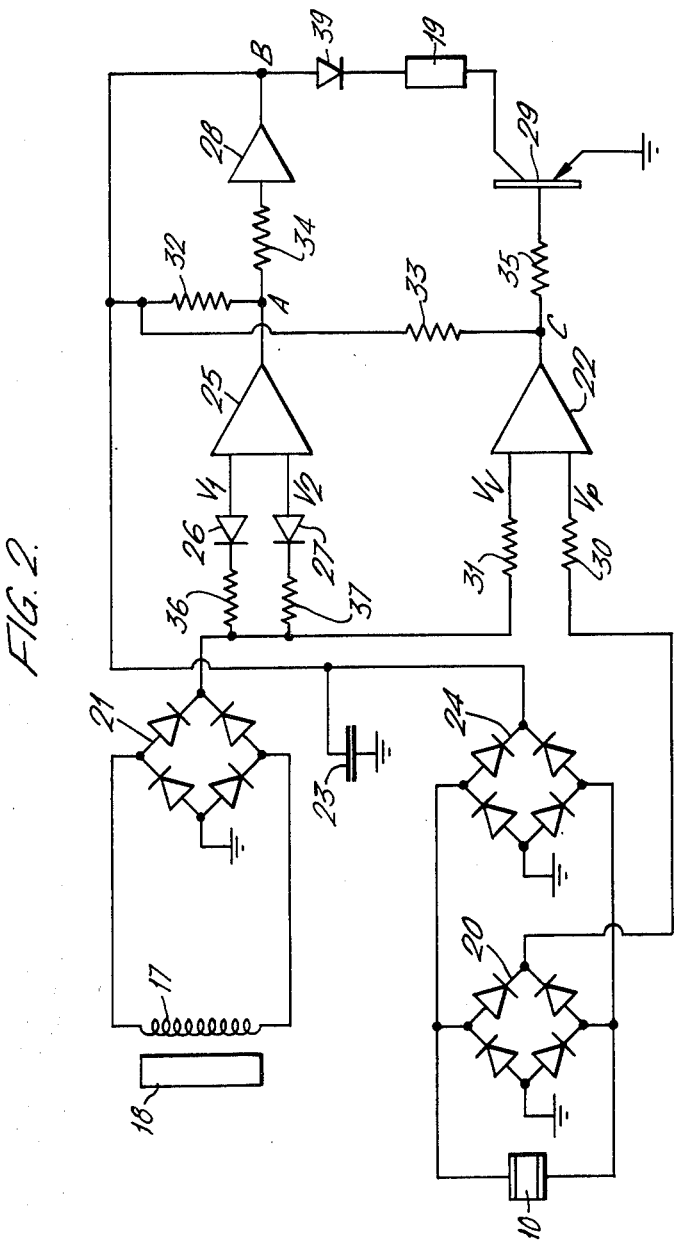

4,141,236

HYDRAULIC SHOCK ABSORBER WITH OUT-OF-LIMIT INDICATOR

BACKGROUND OF THE INVENTION

This invention relates to the measurement of force/velocity characteristics, for example, in shock absorbers for railway rolling stock.

Shock absorbers are devices designed to produce a resistive force between parts in relative motion, the force being a predetermined function of the velocity. In applications such as rolling stock shock absorbers it is required to monitor this characteristic to ascertain that it continues to lie within specified limits.

SUMMARY OF THE INVENTION

According to the present invention there is provided an arrangement for measuring the force/velocity characteristic of a pair of parts in relative motion designed to produce a hydraulic force which is a function of the relative velocity of the parts comprising means for measuring the relative velocity of said parts, means for measuring the hydraulic force developed by said parts, a circuit coupled to both the velocity and force measuring means to compare the velocity and force signals and an electrochemical color changing cell or coulomb cell coupled to said circuit and responsive to an output from said circuit to cause the cell to change color when the force/velocity characteristic falls outside predetermined limits.

In a preferred embodiment of the invention the force measuring means is a piezo-electric force sensor coupled to the circuit to provide a power source for the circuit and the cell in addition to providing a signal representing the hydraulic force.

BRIEF DESCRIPTION OF THE DRAWINGS

An embodiment of the invention will now be described with reference to the accompanying drawings in which like reference numerals designate like elements and in which:

FIG. 2 is a circuit diagram.

DESCRIPTION OF THE PREFERRED EMBODIMENT

Figure 1:
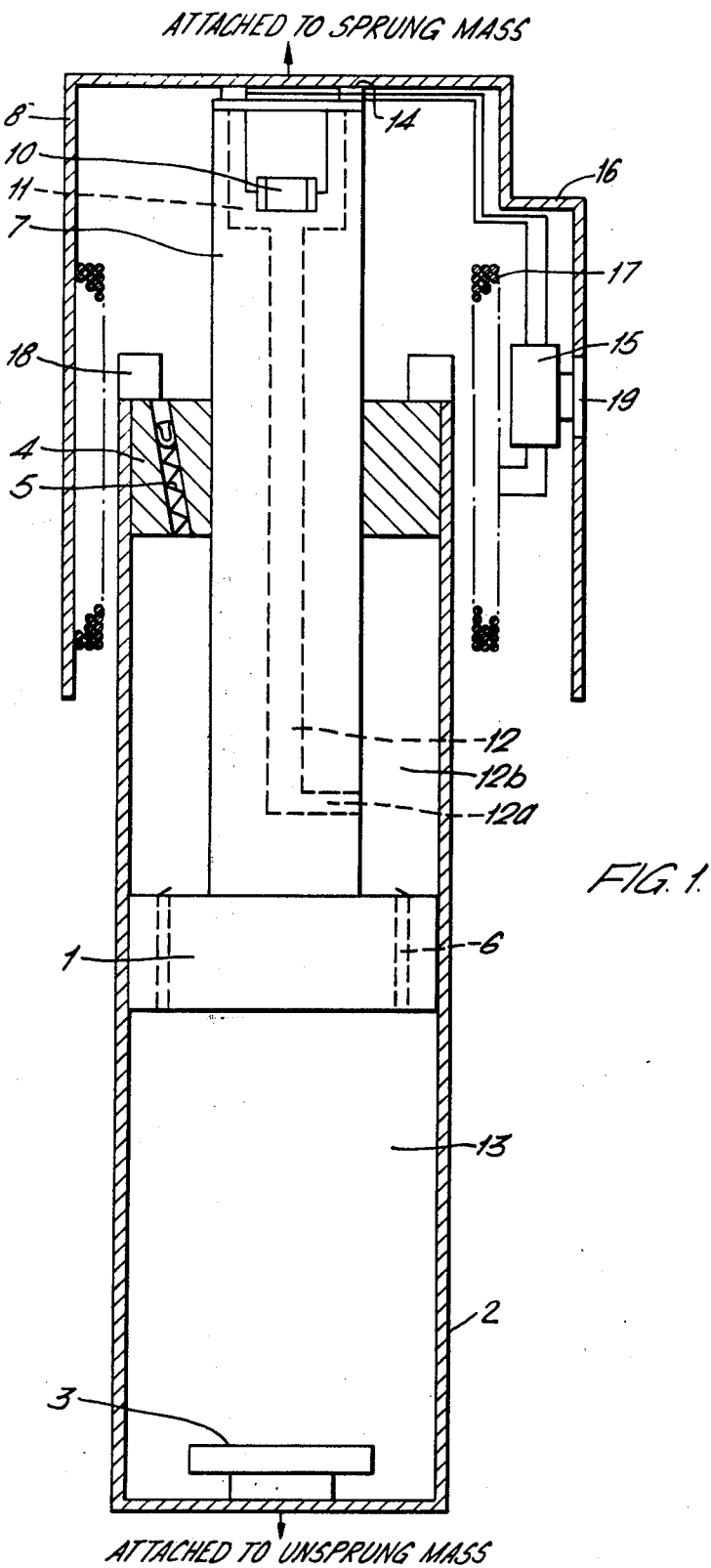
FIG. 1 is a diagrammatic cross-secion through a shock absorber.

The shock absorber depicted in FIG. 1 is basically a conventional device in which a piston 1 moves in a cylinder. The cylinder has a footvalve assembly 3 and sealing guide 4 which is provided with a pressure valve arrangement 5. The piston head has valved passageways 6 communicating between the lower pressure chamber 13 and upper pressure chamber 12b. Attached to the piston rod 7 is a dust-cover 8 which overlies the outer wall of the cylinder. Not shown are full details of all the hydraulic passageways and reservoirs which such a shock absorber normally incorporates.

To monitor the force/velocity characteristic the shock absorber is fitted with two transducers. The force transducer is a piezo-electric generator 10 located within a bored out chamber 11 in the end of the piston rod 7. This chamber is connected via a central bore 12 and side bore 12a with the upper pressure chamber 12b. The transducer 10 is connected via contact pads 14 to a solid state circuit 15 carried on the inside of a bulge 16 in the dust cover 8. The velocity transducer consists of a coil 17 wound on a former attached to the inside of the dust cover 8 and a ring magnet 18 carried on the end of the cylinder 2. The coil 17 is also connected to the circuit 15. Movement of the magnet 18 relative to the coil 17 generates a voltage in the coil 17 proportional to the relative velocity of the magnet 18 and the coil 17. The circuit output is connected to an electro-chemical color change cell or coulomb cell 19 which is located in an aperture in the dust cover so that it is readily visible. It will be appreciated that if the piston and dust cover are the portions of the shock absorber affixed to the vehicle body while the cylinder is affixed to the axle all the parts of the monitoring arrangement except the magnet are located in the sprung part of the shock absorber.

The circuit shown in FIG. 2 comprises essentially two full wave rectifiers 20, 21, connected one each to a transducer. The rectified voltages $V_p$ and $V_v$ are fed via resistors 30 and 31, respectively, to a comparator 22 the output of which is $V_p - V_v$. For a "good" shock absorber, i.e., one whose performance is within limits, $V_p - V_v > O$. The output of the comparator 22 is connected via resistor 35 to transistor switch 29 which has its collector connected to the color change cell 19. The circuit is powered by using one of the transducers, e.g., the piezoelectric transducer 10, to charge up a capacitor 23 via a further full wave rectifier 24. The capacitor 23 is connected via diode 39 to the color change cell 19 and to operational amplifiers 25 and 22 via resistors 32 and 33, respectively.

To allow the supply capacitor 23 to be charged without immediate discharge a "window principle" operation is used. That is to say, the drain on the capacitor is inhibited during transient conditions. Thus, the comparison between $V_p$ and $V_v$ is only undertaken when the voltage "window" $V_1 < V_v < V_2$ is "open". This is governed by operational amplifier 25. Voltages $V_1$ and $V_2$ are derived from the velocity transducer via serially connected resistor 36 and diode 26 and serially connected resistor 37 and diode 27, respectively. If the shock absorber is "good" no signal enters amplifier 25 in the quiescent state. The potential at point A is high and at point B low, owing to the inclusion of inverter 28 connected to the output of amplifier 25 via resistor 34. Thus, even if transistor 29 were conducting no current would flow in the color change cell 19. When the shock absorber reaches a velocity such that the voltage $V_1$ is reached or exceeded, then the potential at point A becomes low and that at point B high, allowing current to flow in the cell 19 if transistor 29 is conducting. However, if the shock absorber is "good" $V_p > V_v$ and the output of the comparator 22 is such that the potential at point C is low and transistor 29 is cut off. No current will flow in cell 19 in this condition. When the shock absorber velocity is increased to the point where $V_2$ is reached or exceeded then point A becomes high and point B low and the circuit is deactivated.

However, if the shock absorber has failed and the situation $V_p - V_v < O$ occurs, then point C at the output of comparator 22 has a high potential so that transistor 29 is conducting. Now when the velocity voltage passes through the "window" region where $V_1 < V_v < V_2$, and hence point B has a high potential, current will flow in the cell 19 and the color of the cell will change.

In an alternative circuit arrangement the power supply capacitor could be charged by the velocity transducer if the developed voltage is high enough under normal conditions.

It will be appreciated that in the event of a failure of the shock absorber several hours of operation may be required before sufficient energy has been developed and applied to the cell 19. This is of little consequence since, in the case of rolling stock, examination of the cell can only normally take place when the stock is being assembled into a train before a journey and this will occur probably not more frequently than once every 24 hours.

What is claimed is:

1. An arrangement for measuring the force/velocity characteristic of a pair of parts in relative motion designed to produce a hydraulic force which is a function of the relative velocity of the parts comprising:

first means for generating a first signal corresponding to the relative velocity of said parts;

second means for generating a second signal representative of the hydraulic force developed by said parts;

third means for comparing the first and second signals and for generating an output signal when a predetermined relationship exists between said first and second signals;

fourth means for generating a visual indication in response to said output signal indicating when the force/velocity characteristic falls outside predetermined limits.

2. An arrangement according to claim 1, wherein the first means comprises:

a coil attached to one of said parts and coupled to the third means; and a magnet attached to the other part, the coil and magnet being so disposed that relative movement of said parts causes the magnet to induce an electromotive force in the coil.

3. An arrangement according to claim 1, wherein the second means comprises a piezo-electric force sensor coupled to the third means.

4. An arrangement according to claim 1, further comprising: fifth means for determining when one of said first and second signals lies within a predetermined range of values, and sixth means for controlling the application of said output signal to said fourth means such that said output signal is applied to said fourth means when said output signal has a value within said predetermined range.

5. An arrangement according to claim 1, wherein said fourth means comprises an electrochemical color change cell.

6. An arrangement for measuring the force/velocity characteristic of a pair of parts in relative motion designed to produce a hydraulic force which is a function of the relative velocity of the parts, comprising:

a first sensor for generating a first signal corresponding to the relative velocity of said parts;

a second sensor for generating a second signal representative of the hydraulic force developed by said parts;

a comparator having first and second input terminals respectively coupled to said first and second sensors for comparing said first and second signals and for generating an output signal when said first and second signals have a predetermined relationship; and an indicator means coupled to said comparator for indicating when the force/velocity characteristic falls outside predetermined limits.

7. An arrangement according to claim 6, further comprising:

a controlled switch means having a control input connected to said comparator and a switched output connected to said indication means.

8. An arrangement according to claim 7, wherein said indicator means comprises an electrochemical color change cell.

9. An arrangement according to claim 7, further comprising:

an enable circuit having first and second inputs coupled to one of said sensors and an output coupled to said indicator means, said enable circuit responsive to the signal of said one of said sensors having a value within a predetermined range of values to enable said indicator means.

10. An arrangement according to claim 9 wherein said indicator means comprises an electrochemical color change cell.

11. An arrangement according to claim 6, further comprising a supply capacitor coupled to one of said sensors and to said indicator means.

* * * * *